United States Patent [19]
Asada et al.

[11] Patent Number: 5,524,464
[45] Date of Patent: Jun. 11, 1996

[54] WORKPIECE-BORE PROCESSING APPARATUS AND METHOD

[75] Inventors: Takafumi Asada, Hirakata; Masato Morimoto, Neyagawa, both of Japan

[73] Assignee: Matsushita Electric Industrial Co., Ltd., Osaka-fu, Japan

[21] Appl. No.: 314,293

[22] Filed: Sep. 30, 1994

[30]   Foreign Application Priority Data

Sep. 30, 1993  [JP]  Japan .................... 5-244463

[51] Int. Cl.$^6$ .................... B21C 31/00; B21D 53/10
[52] U.S. Cl. .................... 72/20.1; 29/90.01; 29/898.02; 29/898.13; 72/75; 72/354.6
[58] Field of Search .................... 29/90.01, 898.02, 29/898.054, 898.13; 72/10, 16, 19, 75, 370

[56]   References Cited

U.S. PATENT DOCUMENTS

| 5,247,819 | 9/1993 | Morimoto et al. . |
| 5,339,523 | 8/1994 | Hasegawa ............... 29/898.02 |

FOREIGN PATENT DOCUMENTS

| 956428 | 1/1950 | France ...................... 72/75 |
| 3-68768 | 10/1991 | Japan . |
| 799414 | 8/1958 | United Kingdom ............ 72/75 |

Primary Examiner—S. Thomas Hughes
Attorney, Agent, or Firm—Wenderoth, Lind & Ponack

[57]   ABSTRACT

A plurality of processing balls with different outer diameters are prepared at a slidable or rotatable upper stage. One ball, selected from the plurality of prepared balls in correspondence with the inner diameter of a bore of a workpiece, is inserted through the bore while being pressed by a pin.

6 Claims, 8 Drawing Sheets

WORKPIECE-BORE PROCESSING APPARATUS AND METHOD

BACKGROUND OF THE INVENTION

The present invention relates to a workpiece-bore processing apparatus and method wherein a processing ball with the same outer diameter as an inner diameter of a bore of a workpiece or a diameter slightly larger than the diameter of the bore is inserted through the bore under pressure to finish an inner surface of the bore.

Recently, with the rising trend in the speed and precision requirements with respect to bearings used in office equipment and household appliances, there has been an increasing need for fluid bearings of the dynamic pressure type and also for special types of sleeve bearings processed to special precision requirements. The present invention can be applied to, for example, sleeve bore finishing with respect to high precision bearings and, more particularly, to a bearing bore processing apparatus and method for finishing a sleeve bore of a bearing to high precision by controlled special plastic working and without using cutting and abrading techniques.

The construction of a conventional bearing bore processing apparatus is illustrated in FIGS. 8 to 10 of the accompanying drawings. In the figures, element 11 is a sleeve of a bearing as one example of a workpiece; element 11A is a bearing bore; element 12 is a dynamic pressure generating groove; element 13 is a residual projection; element 14 is a processing ball formed of a material such as hardened steel, and element 15 is a pin.

Conventionally, the process of bore processing with respect to precision bearings, such as dynamic pressure type grooved fluid bearings, is carried out in such a way that as FIG. 8 illustrates, the bearing bore 11A of the sleeve 11 is processed through a cutting process and otherwise to a diametrical size D1, and thereafter by forming a plurality of dynamic pressure generating grooves 12 by an unillustrated processing tool (e.g., a processing apparatus as shown in Japanese Patent Publication No. 3-68768). Residual projections 13 which may be produced during this processing are removed by a so-called ball burnishing technique such that a processing ball 14 having a given diameter Db which is made of hardened steel or the like is thrustingly forced through the bore by the pin 15 as illustrated in FIG. 9.

As a result of such a ball burnishing process, the bore of the sleeve 11 is finished to a diameter D2 slightly larger than the inner diameter D1 of a roughly-processed bore. In FIG. 10, the bore 11A of the sleeve 11 is structurally less tough at positions adjacent opposite ends thereof, whereat it involves considerable plastic deformation due to the ball burnishing process as shown by D3. This naturally results in unsatisfactory cylindricity of the bore.

Further, with the foregoing arrangement, as shown in FIG. 11, the roughly-processed bore diameter D1 of the sleeve 11 involves a variation on the order of 6 μm relative to the reference diameter of the bore (e.g., in the range of from −5 to +1 μm relative to the reference diameter) depending upon the cutting process conditions involved, and accordingly, the finished diameter D2 may involve a variation of the same order as that of the roughly-processed bore diameter. From the standpoint of mass production, therefore, it has hitherto been extremely difficult to finish the bore diameter to tolerance of about 1 to 3 μm (specifically, in the range of from −1 to +1 μm) which is required for provision of a precision bearing sleeve.

SUMMARY OF THE INVENTION

Accordingly, the object of the present invention is to provide a workpiece-bore processing apparatus and method capable of finishing an inner surface of a bore of a workpiece with a high accuracy through special controlled plastic, without using conventional cutting working and polishing processes through which it is difficult to process the workpiece with high a accuracy.

In accomplishing the objects, according to a first aspect of the present invention, there is provided a workpiece-bore processing apparatus for processing an inner surface of a bore of a workpiece by inserting a processing ball through the bore of the workpiece, comprising:

a processing ball supply device having processing balls with different outer diameters;

a processing ball selecting device for selecting one of the balls provided in the supply device which has an outer diameter in a range of $1*D1$ through $1.02*D1$ when D1 denotes an inner diameter of the bore of the workpiece; and a processing ball pressing and inserting device for inserting the ball selected by the selecting device and supplied from the supply device through the bore of the workpiece under pressure.

According to a second aspect of the present invention, there is provided a workpiece-bore processing apparatus for processing an inner surface of a bore of a workpiece by inserting a processing ball through the bore of the workpiece, comprising:

a measuring ball inserting device for pressing and inserting a measuring ball through the bore of the workpiece, the measuring ball having an outer diameter Db1 in a range of $D1 \leq Db1 \leq (1.003*D1)$ when D1 denotes an inner diameter of the bore of the workpiece, and detecting load size caused when the measuring ball is passed through the bore, before inserting the processing ball into the bore of the workpiece;

a processing ball supply device having processing balls with different outer diameters;

a processing ball selecting device for, based on a detected result of the measuring ball inserting device, selecting one of the balls provided in the supply device, the selected ball having an outer diameter Db in a range of $Db1 \leq Db \leq (1.02*D1)$ when D1 denotes the inner diameter of the bore of the workpiece and Db1 denotes the outer diameter of the measuring ball; and a processing ball pressing and inserting device for inserting the ball selected by the selecting device and supplied from the supply device through the bore of the workpiece under pressure.

According to a third aspect of the present invention, there is a provided a workpiece-bore processing method for processing an inner surface of a bore of a workpiece by inserting a processing ball through the bore of the workpiece, comprising steps of:

pressing and inserting a measuring ball through the bore of the workpiece which has an outer diameter Db1 in a range of $D1 \leq Db1 \leq (1.003*D1)$ when D1 denotes an inner diameter of the bore of the workpiece and detecting load size caused when the measuring ball is passed through the bore, before inserting the processing ball into the bore of the workpiece;

selecting, based on a detected result of the measuring ball inserting step, one of the processing balls with different outer diameters, the selected ball having an outer diameter Db in a range of Db1≦Db≦(1.02*D1) when D1 denotes the inner diameter of the bore of the workpiece and Db1 denotes the outer diameter of the measuring ball; and inserting the selected ball through the bore of the workpiece under pressure.

In accordance with the foregoing arrangement, one ball having a particular diameter most suited for finishing the bore of the workpiece to the required diametrical size is selected from among the plurality of processing balls, and the selected processing ball is forcibly passed through the bore of the workpiece, whereby the bore is subjected to plastic deformation for being finished to the required diametrical size.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENTS

Figure 1:
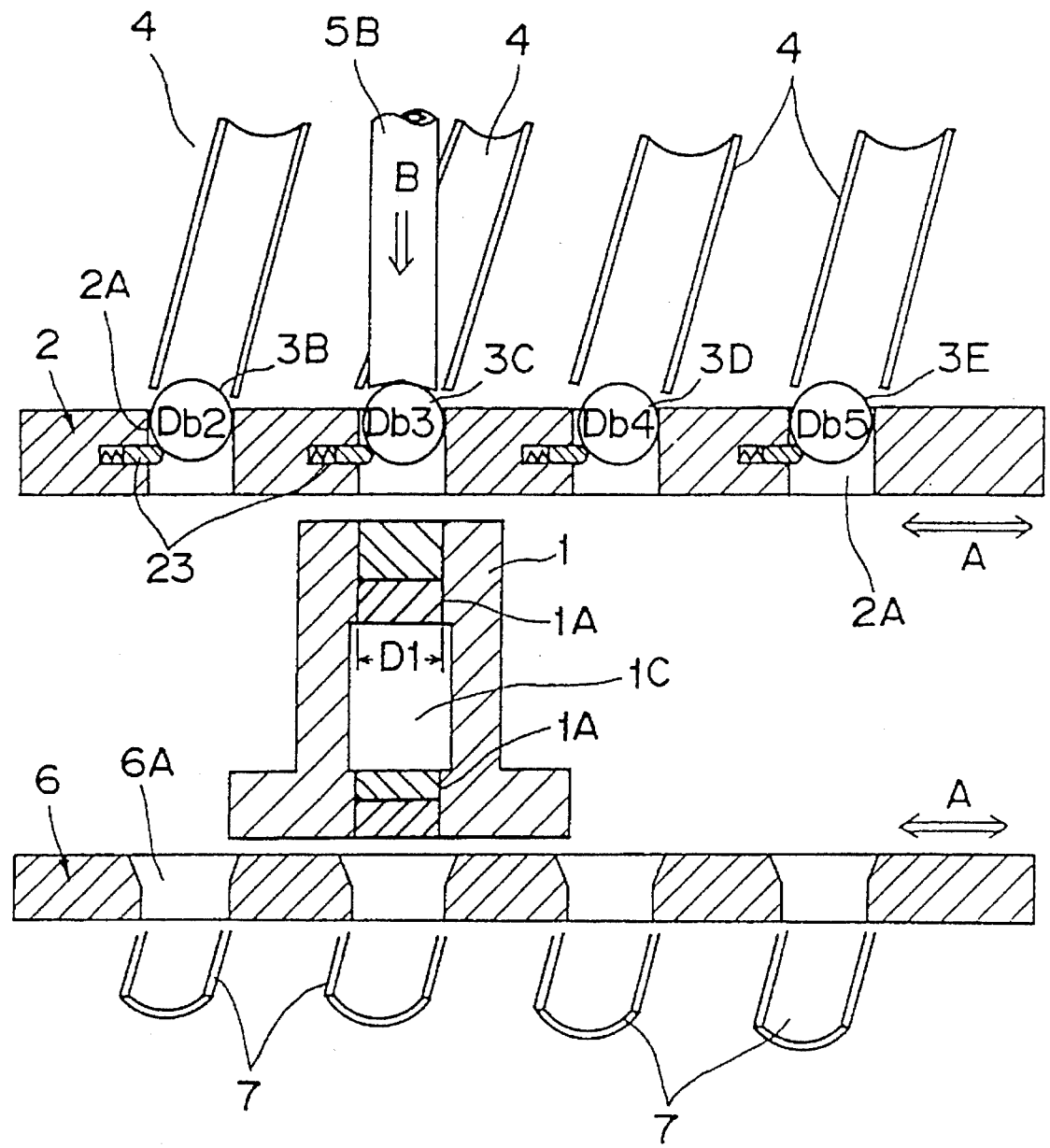
FIG. 1 is a partially sectional view showing a workpiece-bore processing apparatus according to a first embodiment of the present invention.

Before the description of the present invention proceeds, it is to be noted that like parts are designated by like reference numerals throughout the accompanying drawings.

A workpiece-bore processing apparatus and method according to embodiments of the present invention will be described with reference to FIGS. 1–7.

Figure 2:
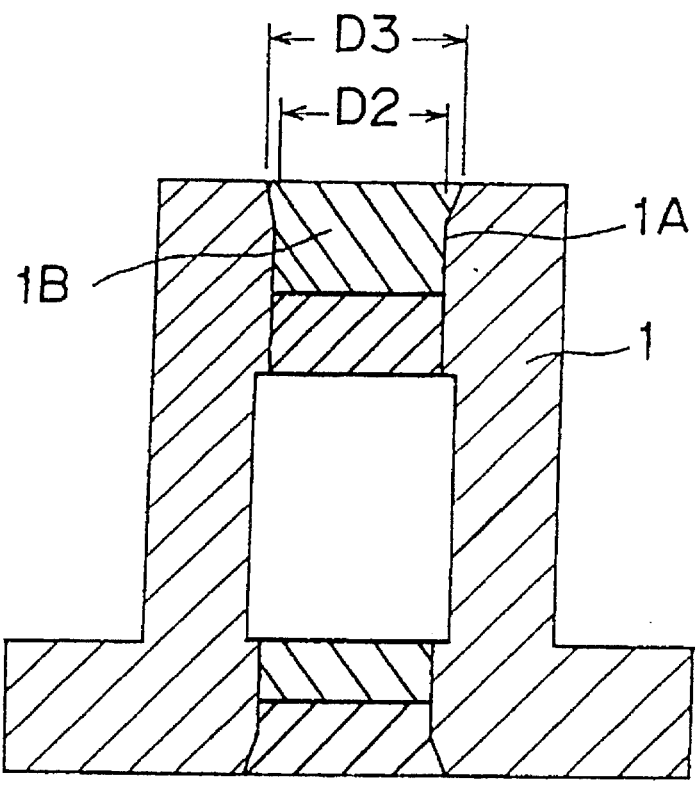
FIG. 2 is a longitudinally sectional view of a sleeve which has processed by the apparatus according to the first embodiment of the present invention.
Figure 3:
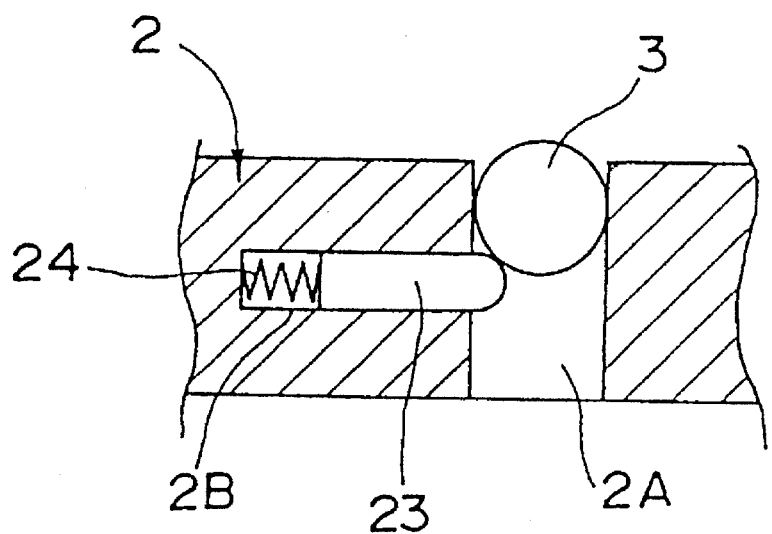
FIG. 3 is an enlarged view of a stopper of the apparatus.
Figure 6:
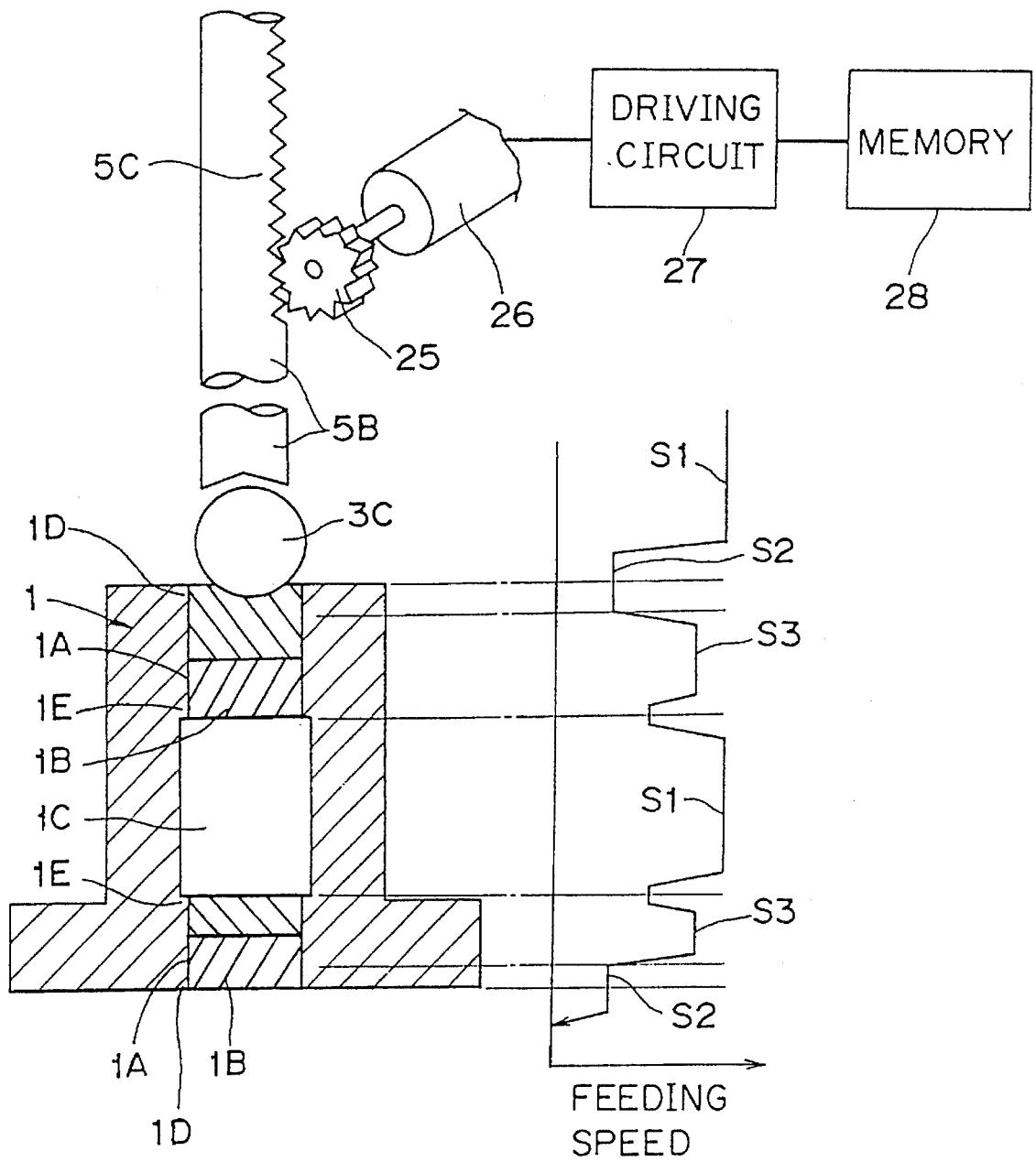
FIG. 6 is a view explanatory of a workpiece-bore processing apparatus according to a third embodiment of the present invention and a graph showing its feeding speed control.

FIG. 1 shows a workpiece-bore processing apparatus and a method for processing a workpiece-bore using the apparatus according to a first embodiment of the present invention. In FIG. 1, element 1 is a sleeve having a bearing bore 1A for a dynamic pressure fluid bearing which serves as one example of a workpiece to be processed. The sleeve 1 is made of plastically deformable material, e.g., a metal such as copper or the like, and has dynamic pressure generating grooves 1B formed on the inner peripheral surface of the bore 1A as required as shown in FIG. 2. Reference numeral 2 designates an upper stage slidable or rotatable in directions A in FIG. 1. The upper stage 2 has a plurality of guide holes 2A, and stoppers 23 disposed in the respective guide holes 2A. A plurality of processing ball (sizing ball) 3B, 3C, 3D, 3E of different diameters for finishing or burnishing the inner surface of the roughly-processed bore of the workpiece which are made of hardened steel are arranged in the guide holes 2A, the balls 3B, 3C, 3D, 3E being supplied by a processing ball supply device 4 comprising a chute-like or tubular ball-supply means. Element 5B is a pin serving as a pressing member which is slidable in the direction B as shown in FIG. 1, and 6 is a lower stage which is integrally moved with the upper stage 2 and has holes 6A corresponding to the holes 2A of the upper stage 2 for receiving one of the balls 3B, 3C, 3D, 3E being passed through the sleeve 1. Under the hole 6A of the lower stage 6, chutes 7 are arranged for recovering the ball. The recovered balls 3B, 3C, 3D, 3E are washed with a not-shown washing device and then are supplied to the supply device 4 for recycling. The stopper 23 is arranged in a recess 2B elongated in a direction perpendicular to the axial direction of each hole 2A of the upper stage 2, and is normally urged by a spring 24 so as to enter the hole 2A, as shown in FIG. 3. The stopper 23 projects in the hole 2A to prevent the ball 3B, 3C, 3D, 3E from dropping from the hole 2A and thus hold the ball in the hole 2A. When the ball is downwardly pressed by the pin 5B, the stopper 23 is pressed in the recess 2B against the urging force of the spring 24 and thus the ball 3B, 3C, 3D, 3E drops through the hole 2A to be supplied into the roughly-processed bore 1A of the sleeve 1.

Operation of the above constructed workpiece-bore processing apparatus will be described with reference to FIGS. 1 and 2.

FIG. 2 illustrates the sleeve 1 for bearing as one example of the workpiece to be processed according to the first embodiment. In FIG. 1, the balls 3B, 3C, 3D, 3E are almost identical in diameter (e.g. specifically, 3 mm), but are diametrically so set as to be slightly different stepwise (e.g. specifically, by 2 μm each) in ascending order of from the diameter Db2 for the processing ball 3B to the diameters Db3, Db4, Db5 for the processing balls 3C, 3D, 3E. These balls 3B, 3C, 3D, 3E are arranged in the guide holes 2A of the upper stage 2 of the supply device 4, and are lightly supported by the corresponding retractable stoppers 23 that the balls do not fall by their own weight. The sleeve 1 is supplied between the upper stage 2 and the lower stage 6. The diameter of the roughly-processed bore 1A of the sleeve 1 is roughly predicted. For example, the bore 1A of the sleeve 1 is roughly processed through cutting work in the range of from −5 to +1 μm, i.e. within tolerance of 6 μm, relative to a reference diameter of the bore 1A of the sleeve 1. If the diameter of the roughly-processed bore 1A is relatively small within the tolerance, the upper stage 2 and the lower stage 6 slide integrally with each other to permit one diametrically-smaller ball 3B, together with the pin 5B, to move to a position just above the roughly-processed bore 1A of the sleeve 1 so that the ball 3B may be selected as such. Then, the ball 3B is forced, i.e. pressed and inserted through the roughly-processed bore 1A of the sleeve 1 under a force greater than the urging force of the corresponding stopper 23, so that the roughly-processed bore 1A is sized or finished by plastic working to the desired bore diameter (e.g., within the tolerance of 2 μm, i.e., in the range of from −1 to 1 μm relative to a reference diameter of the bore of the sleeve 1). At this time, the diameter Db2 of the ball 3B is preset to be larger than the diameter D1 of the roughly-processed bore 1A by 3 to 60 μm (about 20 μm in the example shown). If the roughly-processed bore 1A of the sleeve 1 supplied is relatively large within the tolerance, the upper stage 2 and the lower stage 6 slide relative to each other to permit selection of one ball 3E which has a relatively large diameter Db5. The ball 3E is thus forced through the bore 1A by the pin 5B so that the roughly-processed bearing bore 1A is sized or finished by plastic working to the desired size. The balls 3B, etc. which have passed through bearing bores 1A are collected through the plural chutes 7 provided at the lower stage 6 for return to the ball supply device 4 for being recycled into the bore processing process. The sleeve 1 which has passed through the process of bore processing, as FIG. 2 shows, has its bore finished to diametrical size D2 (in the range of from −1 to +1 μm relative to the reference diameter in the example shown). Further, because of the selection of one diametrically optimum ball 3, any possible deformation at opposite sides of the bore 1A as shown by D3 in FIG. 2 can be substantially reduced as compared with the conventional level.

Figure 4:
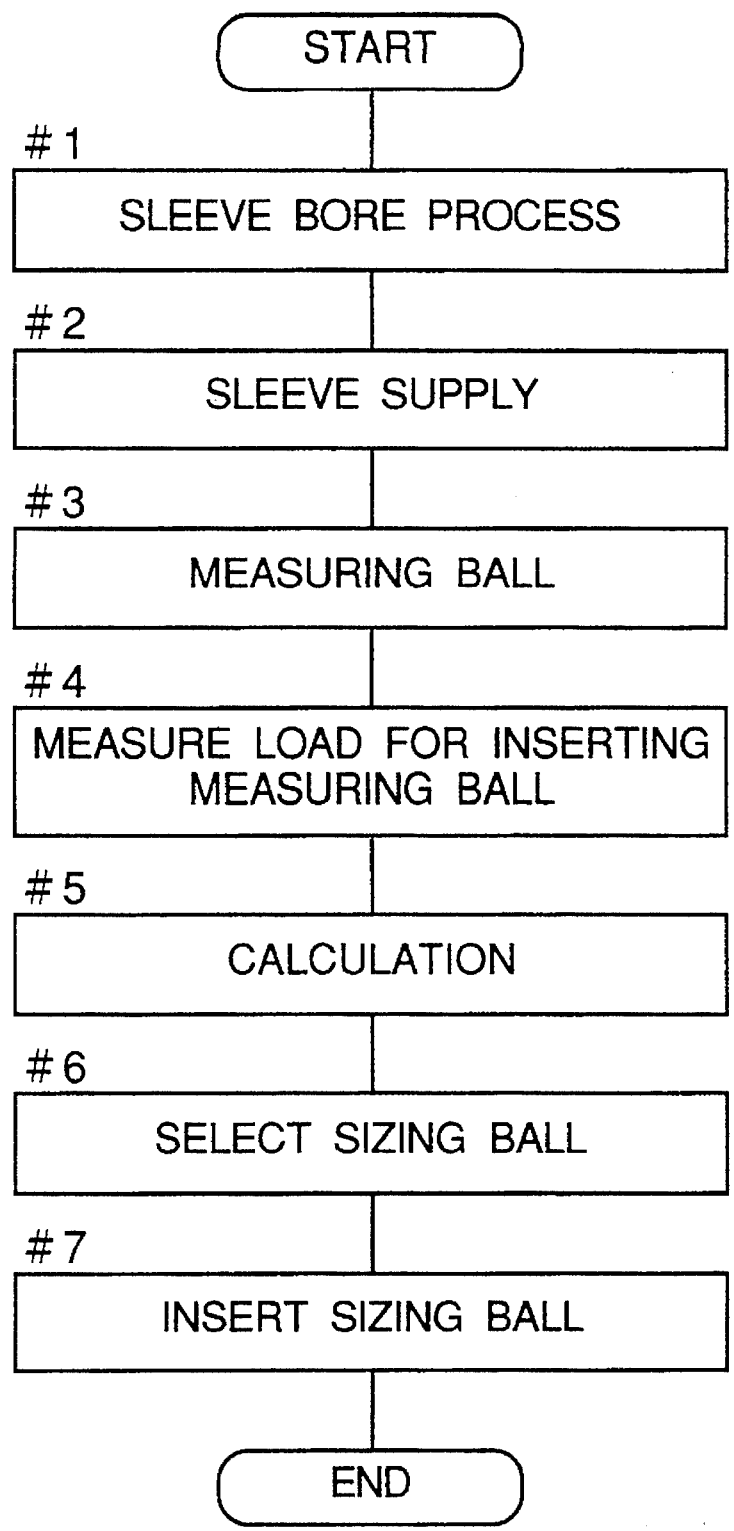
FIG. 4 is a flowchart showing a workpiece-bore processing method according to the first embodiment of the present invention.

FIG. 3 illustrates a workpiece-bore processing apparatus according to a second embodiment of the present invention. FIG. 4 is a flowchart of a workpiece-bore processing method using the apparatus. In the second embodiment, when the ball is selected, a measuring ball 3A is firstly inserted through the roughly-processed bore 1A of the sleeve 1 and the necessary load applied to the ball 3A at that time is detected. Based on the detected result, the ball is selected for finishing process. This point is different from the first embodiment. The measuring ball 3A is used which has an outer diameter for causing no plastic working on the inner surface of the roughly-processed bore 1A of the sleeve 1, i.e., causing only elastic deformation thereon.

Figure 5:
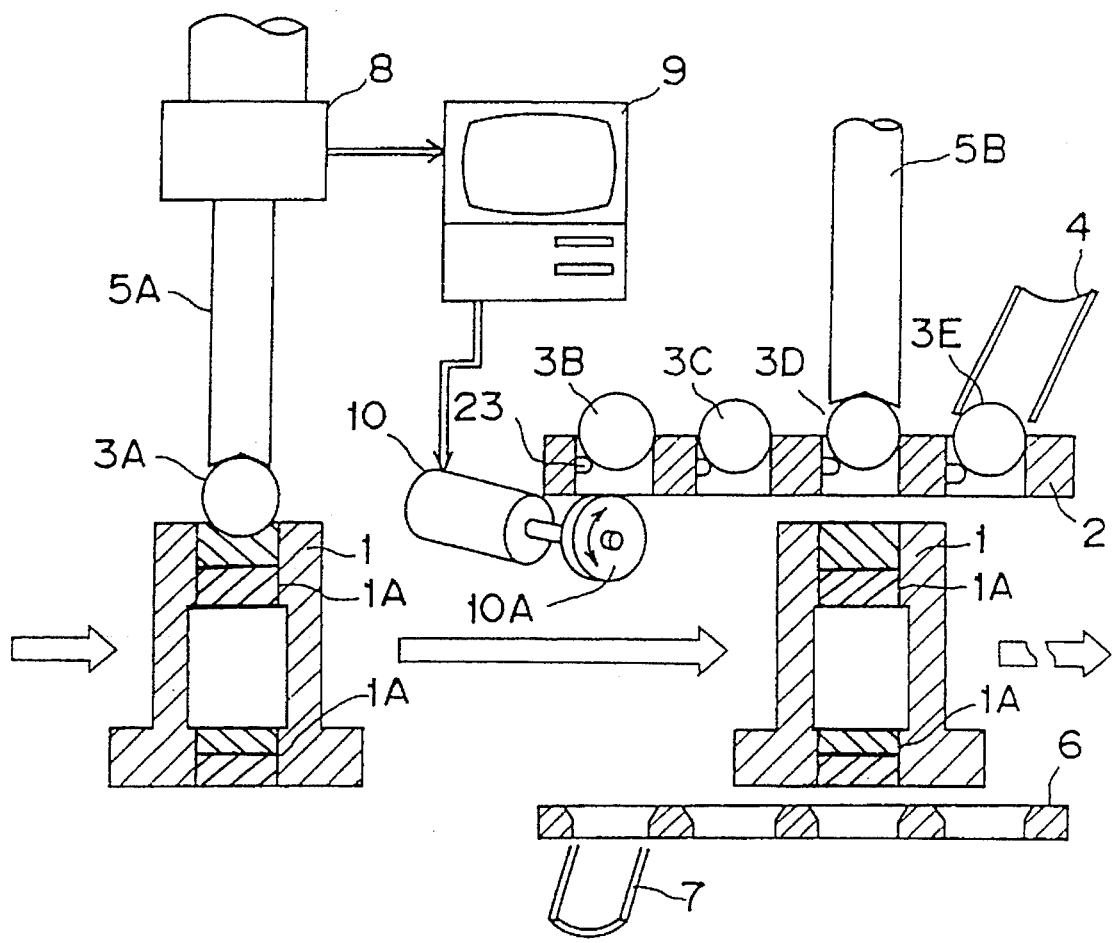
FIG. 5 is a sectional view showing a workpiece-bore processing apparatus according to a second embodiment of the present invention.

In FIG. 5, element 8 is a load cell, arranged at the base portion of a pin 5A, for measuring load required to insert the measuring ball 3A through the roughly-processed bore 1A of the sleeve 1; element 9 is a computer having a controller for performing a specified calculation based on the input indicating the load measured by the load cell 8, and element 10 is a drive means for actuating the upper stage 2 together with the lower stage 6 to slide or rotate based on the output from the computer 9. One example of the drive means includes a motor 10 and a driving roll 10A fixed to a rotary shaft of the motor 10 to slide or rotate the upper stage 2. The motor 10 is controlled by the controller of the computer 9. The drive means can be applied to the first embodiment.

In the second embodiment, firstly, at step #1, the bearing bore 1A of the sleeve 1 as a workpiece is roughly processed. Then, at step #2, the sleeve 1 is supplied between the upper stage 2 and the lower stage 6. At step #3, in order to measure the inner diameter D1 of the roughly-processed bore 1A of the sleeve 1, the measuring ball 3A is selected which has the outer diameter which causes elastic deformation without any plastic working. For example, when the inner diameter of the roughly-processed bore 1A of the sleeve 1 is about 5 mm, the outer diameter of the measuring ball 3A is larger than the 5 mm-inner diameter of the bore by 1–10 μm, specifically, larger than the reference diameter of the bore by 1 μm. The measuring ball 3A is inserted through the roughly-processed bore 1A of the sleeve 1 at a constant speed, e.g. 5 mm/sec, while being pressed by the pin 5A. At that time, the load, i.e. axial resistance required to press and insert the measuring ball 3A through the roughly-processed bore is measured at step #4. In this case, if the roughly-processed bore inner diameter D1 of the sleeve 1 is 1 μm larger than the reference diameter and identical with that of the ball 3A, the axial resistance of zero, or a very small load on the order of several grams will be detected. If the roughly-processed bore diameter D1 is smaller than the reference diameter, an axial load corresponding to the diametrical difference (1.1 kg for a diametrical difference of 1 μm in the example shown) will be detected. The result is inputted into the computer 9, and the controller performs the specified calculation at step #5. A drive control instruction is issued from the control part of the computer 9 to the drive motor 10. Accordingly, in response to the instruction of the computer 9, the motor 10 actuates the upper stage 2 and the lower stage 6 to go into slide or rotary movement in an integral relationship with each other for the selection of the one most diametrically suitable ball from among the processing balls (sizing balls) 3B, 3C, 3D, 3E at step #6. For example, in FIG. 5, the ball 3D is selected. As a result of this operation, the roughly-processed bearing bore, which has a variation of 6 μm, for example, is automatically sized to the tolerance of one micron order, so that the sized bore can exhibit the desired performance and accuracy standards for a precision bearing. The pins 5A and 5B can be separately provided for use in combination, or one single pin can be used for purposes of the two pins. The surface of each of pin 5A and 5B which contacts the ball 3A, 3B, 3C, 3D, 3E can be formed so as to be flat and is preferably formed in a recessed mortar-shape to easily hold the ball.

The outer diameter Db1 of the measuring ball 3A is generally determined to satisfy the following expression: $D1 \leq Db1 \leq (1.003*D1)$ relative to the inner diameter D1 of the roughly-processed bore 1A of the sleeve 1. In other words, the outer diameter Db1 of the measuring ball 3A is preferably the same as the inner diameter D1 of the roughly-processed bore or is larger than the inner diameter D1 of the roughly-processed bore by 0.3% maximum. The outer diameters Db2, Db3, Db4, Db5 of the balls 3B, 3C, 3D, 3E are determined to satisfy an expression: $Db1 < (Db2 \text{ through } Db5) \leq (1.02*D1)$. In other words, each of the outer diameters Db2, Db3, Db4, Db5 of the balls 3B, 3C, 3D, 3E is larger than the outer diameter Db1 of the measuring ball 3A and is larger than the inner diameter D1 of the roughly-processed bore by 2.0% maximum, preferably.

FIG. 6 illustrates a workpiece-bore processing apparatus according to a third embodiment of the present invention and includes a speed control graph for the apparatus. In the third embodiment, when the ball 3 is inserted through the roughly-processed bore by the pin 5B, the downwardly feeding speed of the pin 5B is changed depending on the portion to be processed of the roughly-processed bore 1A, which is different from the first and second embodiments.

In the apparatus of the third embodiment, a pinion 25 fixed to a rotary shaft of a pulse motor 26 which can change its rotary speed is engaged with a rack 5C of the pin 5B. The driving of the pulse motor 26 is controlled by a driving control circuit 27 which is connected to a memory 28 for storing data indicating a feeding speed graph as shown in FIG. 6, for example. A driving pulse is sent from the driving circuit 27 to the pulse motor 26 based on the data stored in the memory 28 to control the driving of the motor 26 at a desired timing. Thus, the normal and reverse rotations of the motor 26 allows the feeding speed of the pin 5A to be changed at a desired timing so as to move the pin 5B downwardly and upwardly. The driving circuit 27 and the memory 28 can be arranged in or connected to the computer 9 of the apparatus in FIG. 5 according to the second embodiment to be controlled by the computer 9.

One example of the driving control operations will be described below. For example, when either one 3C of the balls is inserted through the roughly-processed bore 1A while the ball 3C is pressed by the pin 5B, in order not to apply excessive stress to the sleeve 1 at the opposite end portions 1D in the vicinity of the openings of the bore, the pin 5B presses the ball 3C at a lower speed as shown by S2 (e.g. 1 mm/sec) in FIG. 6. At the middle portion between the end portions, the pin 5B presses the ball 3C at a higher speed (e.g. 10 mm/sec) as shown by S3 than the low speed of S2 to preform plastic working on the sleeve 1 because there is no obstacles as compared with the application of the load at the end portions even though a load is applied to the bore. The speed of S1 (e.g. 20 mm/sec) indicates a speed for quickly feeding the ball 3C at a portion 1C not to be processed in the sleeve 1. The speed at porions in the vicinity of the not-to-be-processed portion 1C except for the end portions 1D is determined between the speeds of S2 and S3.

Figure 7:
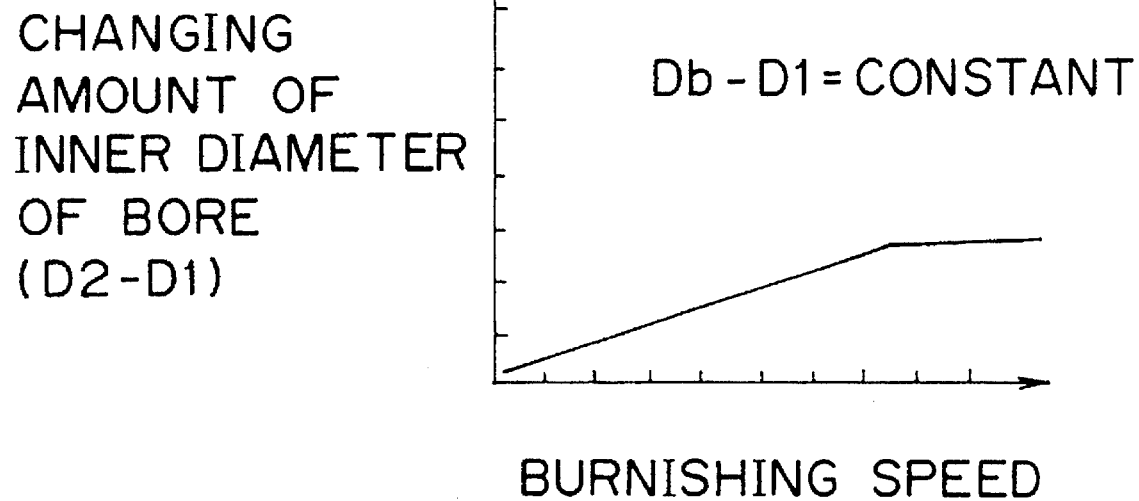
FIG. 7 is a graph showing relationship between the changing amount of the inner diameter of the bore of the sleeve and the burnishing speed in the apparatus according to the third embodiment.
Figure 8:
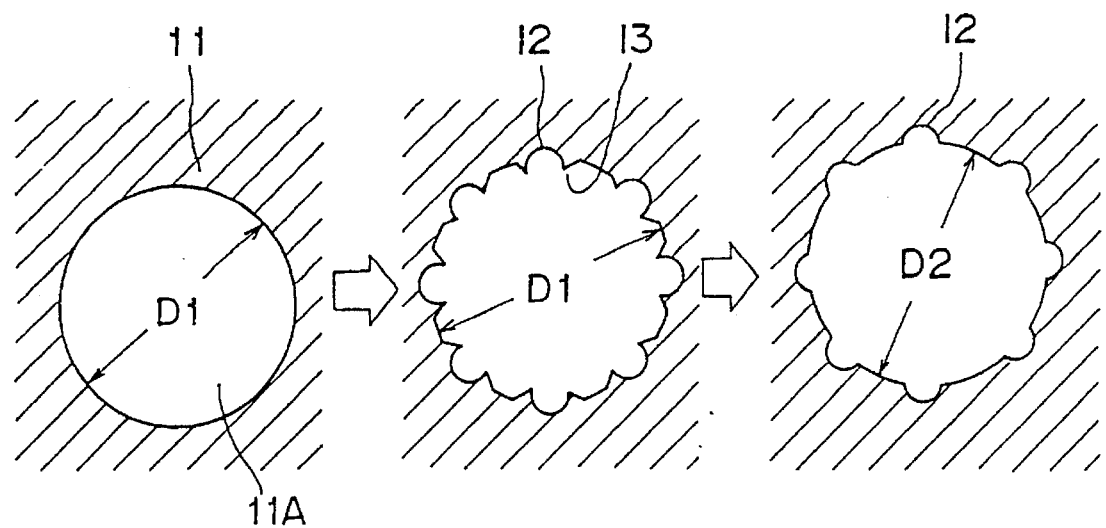
FIG. 8 is an illustration explanatory of the process of bearing bore processing for a dynamic pressure fluid bearing.
Figure 9:
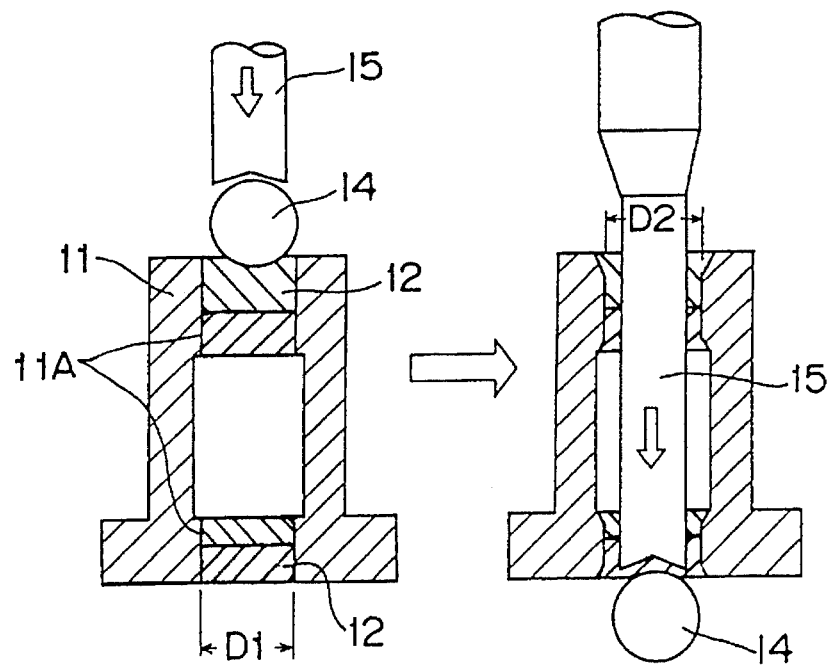
FIG. 9 is a sectional view showing a conventional bearing bore processing apparatus.
Figure 10:
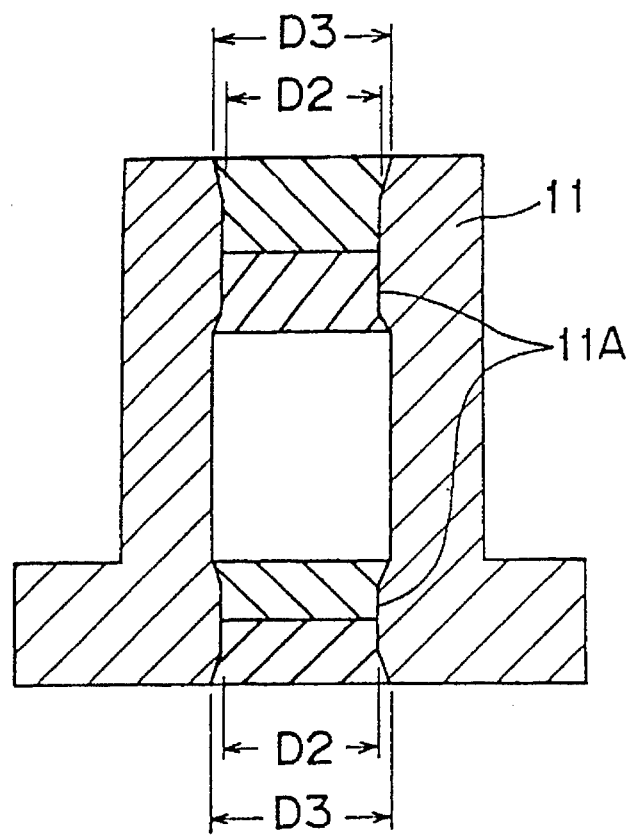
FIG. 10 is a sectional view of a sleeve as seen after bore processing according to a conventional method.
Figure 11:
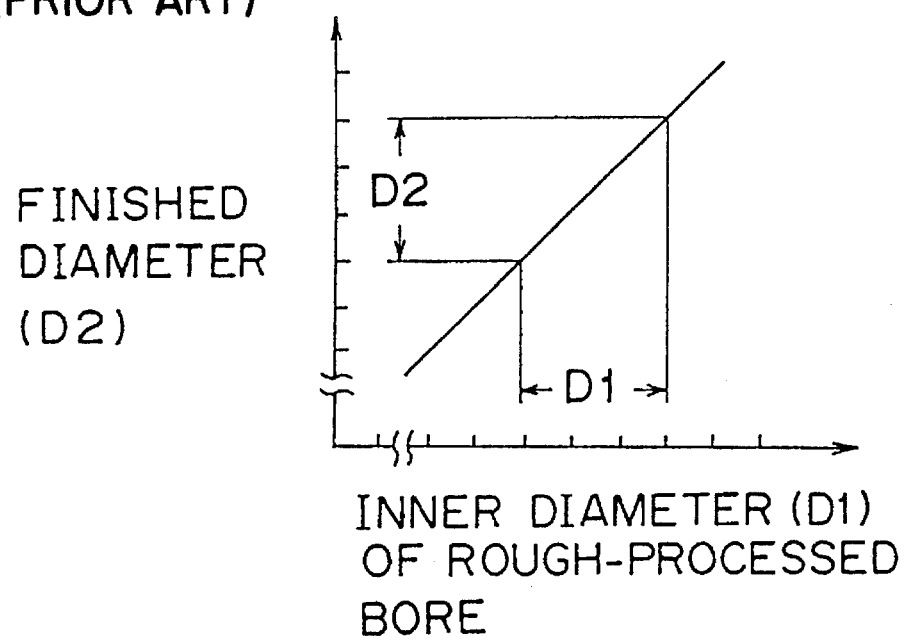
FIG. 11 is a graph showing relationship between the finished bore diameter and the roughly-processed bore diameter when the conventional processing apparatus is employed.

FIG. 7 is a graph showing the relationship between the speed (burnishing speed) when the ball 3C is inserted though the roughly-processed bore and the changing amount of the inner diameter of the roughly-processed bore 1A of the sleeve 1 while there is constant relationship between the outer diameter Db of the ball and the inner diameter of the roughly-processed bore. As shown in FIG. 7, the faster the feed speed, the slightly larger is the change in the bore diameter. Presumably, the reason for this may be that the faster the feed speed, the higher is the working stress exerted on the sleeve 1, which results in an increase in the amount of plastic working. By arranging that the feed speed of ball 3C is slower at both end portions 1D of the bearing bore as described above it is possible to achieve improved cylindricity of the finished bearing bore.

The foregoing effect can be obtained even where no dynamic pressure generating groove 1B is present on the inner periphery of the bearing bore 1A.

As a bore of a workpiece to which the present invention is applied, a hole of a plate can be used, instead of the bore 1A of the sleeve 1.

As above described, according to this embodiment, it is possible to minimize possible variations in the bore diameter by forcing through the roughly-processed bearing bore 1A one processing ball having a particular diameter selected from among a plurality of diametrically different processing balls 3. Therefore, it is possible to carry out high precision bearing processing and to obtain high-performance precision bearings.

The workpiece-bore processing apparatus and method of the invention, as described above, is such that one ball selected from among a plurality of processing balls having different diameters as previously prepared is forced through a roughly-processed bore of a workpiece, whereby the bore of the workpiece can be sized to a high precision level and with possible variations in bore diameter can be reduced on the order of several microns. Therefore, according to the invention, it is possible to carry out high precision workpiece processing.

Although the present invention has been fully described in connection with the preferred embodiments thereof with reference to the accompanying drawings, it is to be noted here that various changes and modifications are apparent to those skilled in the art. Such changes and modifications are to be understood as being included within the scope of the present invention as defined by the appended claims.

What is claimed is:

1. A workpiece-bore processing apparatus for processing an inner surface of a bore of a workpiece by inserting a processing ball through the bore of the workpiece, comprising:

a processing ball supply device having processing balls with different outer diameters;

a processing ball selecting device for selecting one of the balls provided in the supply device which has an outer diameter in a range of 1*D1 through 1.02*D1 when D1 denotes an inner diameter of the bore of the workpiece; and a processing ball pressing and inserting device for inserting the ball selected by the selecting device and supplied from the supply device through the bore of the workpiece under pressure.

2. The workpiece-bore processing apparatus as claimed in claim 1, wherein the pressing and inserting device inserts the selected ball through the bore of the workpiece by a pressing member and a feeding speed of the inserted ball at end portions in a vicinity of openings of the bore of the workpiece is smaller than a feeding speed of the inserted ball at a middle portion between the end portions of the bore.

3. A workpiece-bore processing apparatus for processing an inner surface of a bore of a workpiece by inserting a processing ball through the bore of the workpiece, comprising:

a measuring ball inserting device for pressing and inserting a measuring ball through the bore of the workpiece, the measuring ball having an outer diameter Db1 in a range of D1≦Db1≦(1.003*D1) when D1 denotes an inner diameter of the bore of the workpiece, and detecting load size caused when the measuring ball is passed through the bore, before inserting the processing ball into the bore of the workpiece;

a processing ball supply device having processing balls with different outer diameters;

a processing ball selecting device for, based on a detected result of the measuring ball inserting device, selecting one of the balls provided in the supply device, the selected ball having an outer diameter Db in a range of Db1≦Db≦(1.02*D1) when D1 denotes the inner diameter of the bore of the workpiece and Db1 denotes the outer diameter of the measuring ball; and a processing ball pressing and inserting device for inserting the ball selected by the selecting device and supplied from the supply device through the bore of the workpiece under pressure.

4. The workpiece-bore processing apparatus as claimed in claim 3, wherein the pressing and inserting device inserts the selected ball through the bore of the workpiece by a pressing member and a feeding speed of the inserted ball at end portions in a vicinity of openings of the bore of the workpiece is smaller than a feeding speed of the inserted ball at a middle portion between the end portions of the bore.

5. A workpiece-bore processing method for processing an inner surface of a bore of a workpiece by inserting a processing ball through the bore of the workpiece, comprising steps of:

pressing and inserting a measuring ball through the bore of the workpiece which has an outer diameter Db1 in a range of $D1 \leqq Db1 \leqq (1.003*D1)$ when $D1$ denotes an inner diameter of the bore of the workpiece and detecting load size caused when the measuring ball is passed through the bore, before inserting the processing ball into the bore of the workpiece;

selecting, based on a detected result of the measuring ball inserting step, one of a plurality of processing balls with different outer diameters, the selected ball having an outer diameter Db in a range of $Db1 \leqq Db \leqq (1.02*D1)$ when $D1$ denotes the inner diameter of the bore of the workpiece and $Db1$ denotes the outer diameter of the measuring ball; and inserting the selected ball through the bore of the workpiece under pressure.

6. The workpiece-bore processing method as claimed in claim 5, wherein in the pressing and inserting step, the selected ball is inserted through the bore of the workpiece by a pressing member and a feeding speed of the inserted ball at end portions in a vicinity of openings of the bore of the workpiece is smaller than a feeding speed of the inserted ball at a middle portion between the end portions of the bore.

* * * * *